United States Patent [19]
Gillner et al.

[11] Patent Number: 6,008,473
[45] Date of Patent: Dec. 28, 1999

[54] HEATED REAR SCREEN MADE OF LAMINATED GLASS

[75] Inventors: Manfred Gillner; K. H. Mueller, both of Aachen; Bernd Hoetz, Erkelenz, all of Germany

[73] Assignee: Saint-Gobain Vitrage, Courbevoie, France

[21] Appl. No.: 09/257,942

[22] Filed: Feb. 26, 1999

[30] Foreign Application Priority Data

Feb. 28, 1998 [DE] Germany ................. 298 03 544 U

[51] Int. Cl.$^6$ ........................................... H05B 3/86
[52] U.S. Cl. .................... 219/202; 219/202; 219/522
[58] Field of Search ................. 219/202, 203, 219/522, 547, 201, 520, 543; 428/192; 118/841; 244/121, 134

[56] References Cited

U.S. PATENT DOCUMENTS

| | | | |
|---|---|---|---|
| 3,590,371 | 6/1971 | Shaw, Jr. ........................... | 324/505 |
| 3,729,616 | 4/1973 | Gruss et al. ...................... | 219/522 |
| 3,752,348 | 8/1973 | Dickason et al. ................. | 219/203 |
| 3,903,396 | 9/1975 | Boaz et al. ....................... | 219/547 |
| 4,119,425 | 10/1978 | Marriott ............................ | 65/107 |
| 4,244,774 | 1/1981 | Dery .................................. | 156/574 |

FOREIGN PATENT DOCUMENTS 0349916  1/1990  European Pat. Off. .

*Primary Examiner*—Mark Paschall
*Assistant Examiner*—Vinod D Patel
*Attorney, Agent, or Firm*—Oblon, Spivak, McClelland, Maier & Neustadt, P.C.

[57] ABSTRACT

An electrically heated rear screen including a window formed of laminated glass layers separated by a thermoplastic interlayer and having electrical connection elements provided at opposed lateral edges of the window. Plural parallel connected horizontally extending resistive heating wires are embedded in the thermoplastic interlayer. The resistive heating wires are formed as meandering loops having an odd number of loop segments extending across the width of the window. At the opposed lateral edges of the window, the resistive heating wires have opposed end segments which follow a path along the corresponding lateral edges of the rear screen a short distance apart to a respective common electrical connection element.

23 Claims, 2 Drawing Sheets

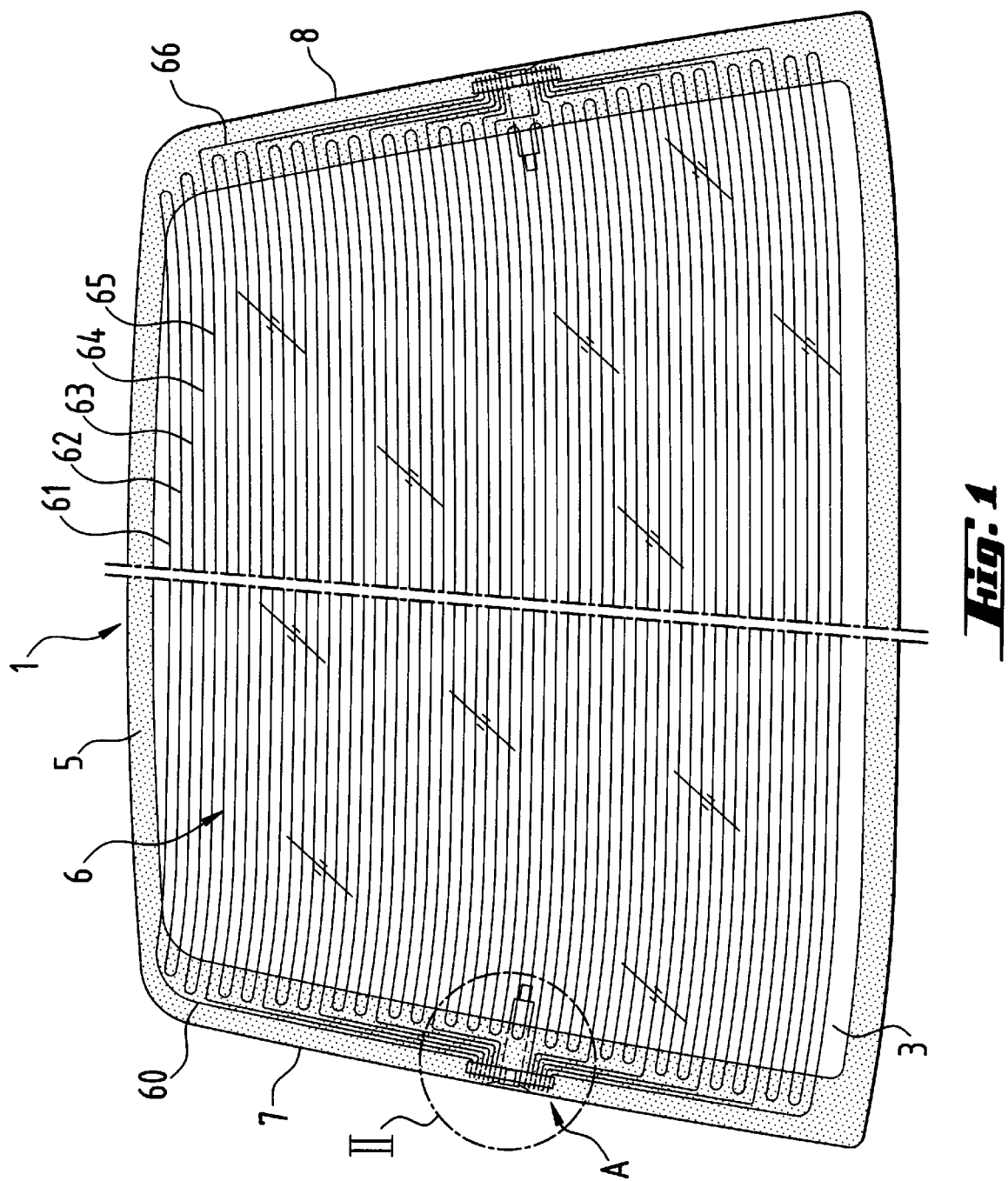

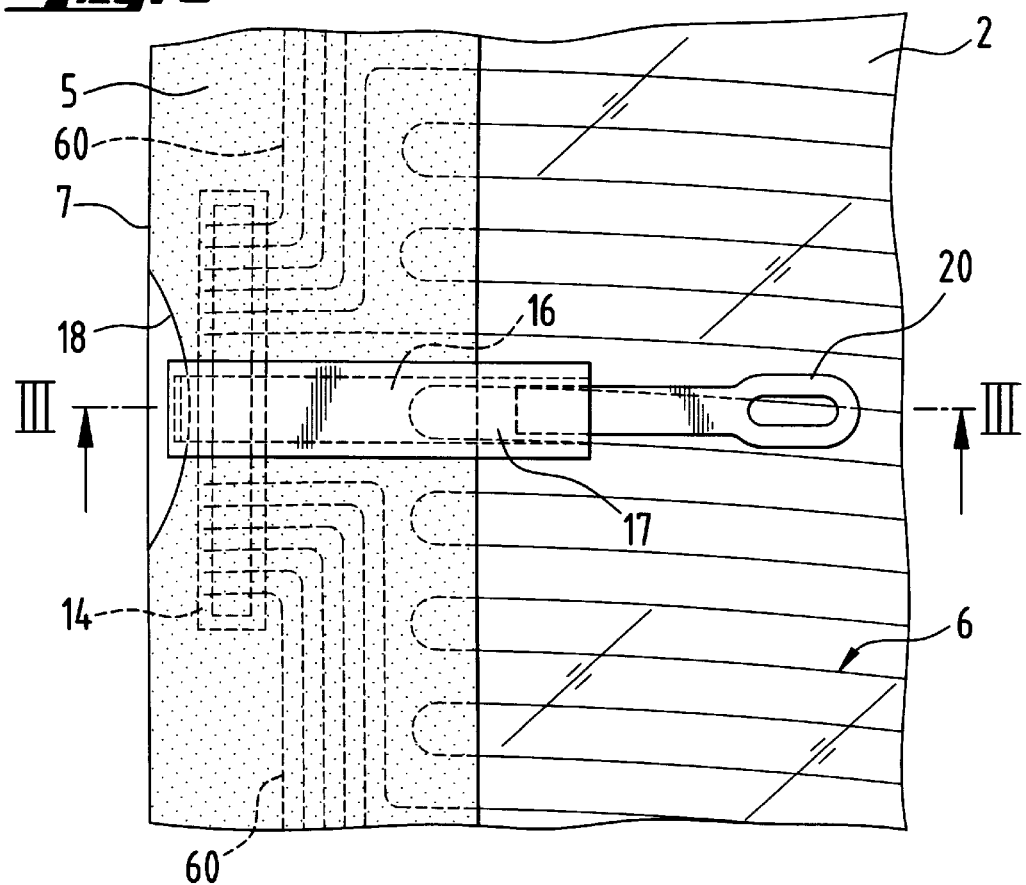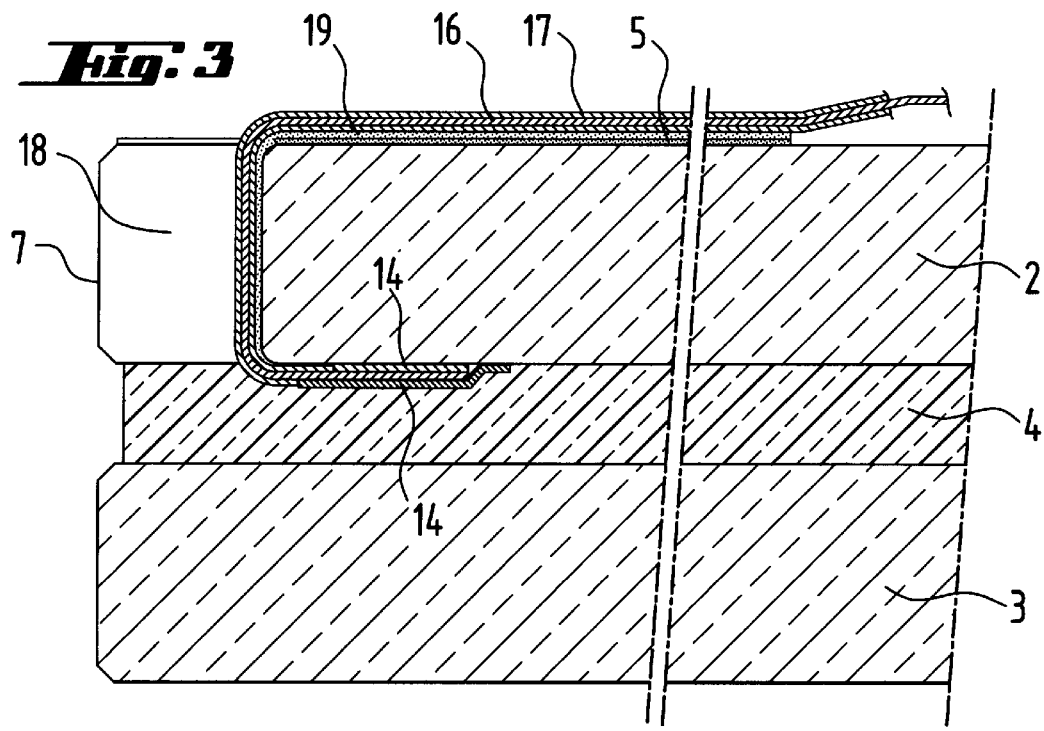

HEATED REAR SCREEN MADE OF LAMINATED GLASS

CROSS REFERENCE TO RELATED APPLICATIONS

This application claims benefit of priority to European Patent Application No. DE 298 03 544.8 filed Feb. 28, 1998, the entire disclosure of which is incorporated by reference herein.

BACKGROUND OF THE INVENTION

1. Field of the Invention

The present invention relates to an electrically heated rear screen made of laminated glass equipped with parallel connected resistive heating wires embedded in and extending horizontally in a thermoplastic interlayer, and in which the resistive heating wires at the two lateral edges of the laminated window are connected to electrical connection elements.

2. Discussion of the Background

Known electrically heated rear screens of this kind include current collecting conductors which, as a general rule, are made of strips of tinned copper foil arranged along the two lateral edges. The length of each of these resistive heating wires is equal to the width of the rear screen and each resistive heating wire is connected at each end to one of the two collecting conductors. Given that the length of the resistive heating wires is limited by the width of the window, it is necessary to use resistive wires which have a relatively high specific resistance, that is to say thin tungsten wires. These are arranged and fixed in the form of a straight or wavy line to a thermoplastic film to which the collecting conductors have already been fixed.

As a general rule, rear screens are mounted in a vehicle using an adhesive bonding technique. In order to protect the adhesive from UV radiation and to prevent the adhesive being visible from the outside, all motor vehicle windows intended to be mounted using the bonding technique are, on their surface which faces the cabin interior, equipped with an opaque decorative border, in dark-colored, preferably black, enamel. The metal collecting conductors which are arranged about 1 to 2 cm from the edge of the window are not particularly appealing from a visual point of view because of their contrast with the decorative border behind them when the window is looked at from the outside. They are therefore covered on the outside by a second opaque layer. This other opaque layer may also be a layer of a color similar to the decorative border, which is connected directly to the surface visible from the outside of the collecting conductor. Embodiments of this kind are known from document DE 19 541 609 A1.

Applying another opaque layer to the surface of the window that is adjacent to the thermoplastic interlayer with a view to covering the collecting conductors is an operation that is costly in terms of labor and which furthermore cannot be completed until the two window panes have been curved. Applying this layer as an ink to be baked prior to curving was hitherto impossible because the two panes stick together during the curving operation because the bake-on ink melts. The results obtained by coating the collecting conductors themselves with such a layer have hitherto not been appealing.

SUMMARY OF THE INVENTION

Accordingly, one object of the invention is to avoid the aforementioned drawbacks and provide an new and improved electrically heated rear screen of the type above mentioned in such a way that the manufacture of electrically heated rear screens is simplified overall and at the same time this heated rear screen can be given a faultless appearance.

This and other objects are achieved in accordance with the invention by providing an electrically heated rear screen in which each of the parallel connected resistive heating wires forms a meandering loop with an odd number of loop segments extending across the width of the rear screen, wherein the end segments of the resistive heating wires follow a path along the corresponding lateral edges of the rear screen a short distance apart as far as the respective point of electrical connection.

The meandering arrangement of the resistive heating wires makes it possible to use wires of low specific resistance, for example heating wires made of copper or of suitable copper alloys. These wires have lower internal tensions than the tungsten wires and are therefore easier to work. An appropriate choice of wire diameter will allow the specific heating power of the resistive heating wires to be adapted to suit the requirements. The use of heating wires made of metals other than tungsten has another major advantage in that these metals allow the brazed contact with the electric connecting element to be markedly better than the contact obtained using tungsten.

Another major advantage according to the invention consists, however, in the fact that despite the fact that the heating wires are connected up in parallel, no lateral collecting conductor is needed which means that no measures need be taken to cover or hide the collecting conductors. As to the heating wires themselves, which are advantageously covered with a dark-colored lacquer to avoid undesirable reflections, their cross section is very small and their presence discreet. The end segments of these heating wires extend along the lateral edges in the zones of the window covered by the decorative black border. Given that these zones are also covered with a dark-colored lacquer, they are barely visible against the dark background of the decorative border and do not constitute a visual impairment.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 1 is an illustration of a rear screen according to the invention, providing an overall view, from the outside;

FIG. 2 is a detailed to a larger scale of the zone II of FIG. 1, but seen from the other side of the rear screen, after the rear screen has been pivoted about a horizontal axis; and FIG. 3 is a cross-sectional view taken along the line III—III of FIG. 2.

DETAILED DESCRIPTION OF THE PREFERRED EMBODIMENTS

Referring now to the drawings, wherein like reference numerals designate identical or corresponding parts throughout the several views, and more particularly to FIG. 1 thereof, the electrically heated rear screen of the present invention is shown in the form of a laminated glass window 1, including an internal pane of glass 2 facing the cabin, and a pane of glass 3 facing the outside which are joined together by a thermoplastic interlayer 4. The internal pane 2 has a decorative border 5 on the bare surface of its edge, the border being made with an opaque, preferably black, bake-on ink. The laminated glass window 1 has electrical heating conductors 6 provided over its entire surface. The heating wires 6 may, in theory, be arranged at any distance apart. Good results are obtained when the distance between the wires is 5 to 20 mm, even 10 mm, and in the case of the heating wires 6, wires having small cross section are used. Before the layer's which make up the laminated glass window are assembled, these wires are placed, in a known way, on the film of thermoplastic polymer which later forms the interlayer 4, and are fixed to the film by applying heat.

In FIG. 1, a total of twelve heating wires are shown connected in parallel. Each heating wire is arranged in the form of a meandering loop and forms five loop segments 61 62, 63, 64 and 65 which in each case cover the entire width of the window connected between opposite end segments 60, 66. The first end segment 60 follows a path parallel to the lateral edge 7 to reach the point of electrical connection A, whereas the other end segment 66 of this heating wire 6 follows a path parallel to the other lateral edge 8 to reach the corresponding point of electrical connection.

In the same way as the resistive heating wire 6 with its segments 60 to 66, the other resistive heating wires are also arranged in the form of meandering loops and their end segments take a path parallel to the end segments 60 and 66 to reach the corresponding electrical connection where, for purposes of parallel connection, they are interconnected and connected up to a flat cable equipped with a connector so that they can be connected in parallel. The parallel connected end segments of the resistive heating wires are advantageously arranged at a spacing of about 2 mm between the wires, so that the heat supplied by the end segments can be distributed over a larger area and avoid excessive local heating.

In the embodiment depicted, the electrical connection elements are situated more or less midway along the lateral edges, which means that below and above the mid-line formed by the electrical connection elements, there are six heating wires arranged each time in the form of meanders. Thus, the number of end segments mutually interconnected in parallel is reduced.

Use will preferably be made of a copper wire of a diameter of 0.085 mm for the resistive heating wire, which wire will be covered by a black lacquer which reflects very little. Given that the end segments of the resistive heating wires follow a path along the lateral edges in the marginal regions covered by the decorative border 5 and given that they do not stand out from the layer of black bake-on ink of the decorative border 5 because of the black coating, the visual effect is not unpleasing to the eye.

To deposit the resistive heating wires on the intermediate thermoplastic layer in such a way as to form meandering loops, appropriate equipment is needed, but equipment for this purpose is already known. One appropriate item of equipment for laying heating wires is described, for example, in document DE 19 541 427.

As emerges from FIGS. 2 and 3, the end segments 60 connected in parallel are bent at right angles to their ends and brought onto a strip of tinned copper foil 14 then brazed thereto. A flat connecting cable 16 is brazed in a known way to the narrow collector conductor which consists of the short strip of copper foil. The flat cable 16 is covered with an insulating coating 17. It passes around the edge of the window 2 at the cut-out 18 in this edge and is bonded to the pane 2 using a layer of adhesive 19. The end of the connecting cable 16 is fitted with a flat plug 20 which is connected to the corresponding socket of the supply cable after the rear screen has been mounted.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. An electrically heated rear screen comprising:
   a window comprising laminated glass layers separated by a thermoplastic interlayer and having electrical connection elements provided at opposed lateral edges of the window;
   plural parallel connected horizontally extending resistive heating wires embedded in the thermoplastic interlayer;
   plural of the resistive heating wires comprising a meandering loop with an odd number of loop segments extending across the width of the window; and
   said resistive heating wires having opposed end segments separately extending in a path along respective of said opposed lateral edges to a respective common electrical connection element at each lateral edge.

2. The electrically heated rear screen according to claim 1, wherein the resistive heating wires are covered with a reflection reducing dark-covered lacquer.

3. The electrically heated rear screen according to claim 1, comprising:
   a decorative border comprising a dark-colored bake-on ink provided on a cabin facing surface of said window and overlapping the end segments of the resistive heating wires following a path parallel to the lateral edges.

4. The electrically heated rear screen according to claim 2, comprising:
   a decorative border comprising a dark-colored bake-on ink provided on a cabin facing surface of said window and overlapping the end segments of the resistive heating wires following a path parallel to the lateral edges.

5. The electrically heated rear screen according to claim 1, wherein the resistive heating wires are made of copper or of a copper alloy covered with a reflection-limiting coating and have a diameter of 0.05 to 0.15 mm.

6. The electrically heated rear screen according to claim 2, wherein the resistive heating wires are made of copper or of a copper alloy covered with a reflection-limiting coating and have a diameter of 0.05 to 0.15 mm.

7. The electrically heated rear screen according to claim 3, wherein the resistive heating wires are made of copper or of a copper alloy covered with a reflection-limiting coating and have a diameter of 0.05 to 0.15 mm.

8. The electrically heated rear screen according to claim 4, wherein the resistive heating wires are made of copper or of a copper alloy covered with a reflection-limiting coating and have a diameter of 0.05 to 0.15 mm.

9. The electrically heated rear screen according to claim 1, wherein the end segments of the resistive heating wires which run parallel to the lateral edges of the laminated glass window are arranged with a mutual spacing of 2 to 5 mm.

10. The electrically heated rear screen according to claim 2, wherein the end segments of the resistive heating wires which run parallel to the lateral edges of the laminated glass window are arranged with a mutual spacing of 2 to 5 mm.

11. The electrically heated rear screen according to claim 3, wherein the end segments of the resistive heating wires which run parallel to the lateral edges of the laminated glass window are arranged with a mutual spacing of 2 to 5 mm.

12. The electrically heated rear screen according to claim 4, wherein the end segments of the resistive heating wires which run parallel to the lateral edges of the laminated glass window are arranged with a mutual spacing of 2 to 5 mm.

13. The electrically heated rear screen according to claim 5, wherein the end segments of the resistive heating wires which run parallel to the lateral edges of the laminated glass window are arranged with a mutual spacing of 2 to 5 mm.

14. The electrically heated rear screen according to claim 6, wherein the end segments of the resistive heating wires which run parallel to the lateral edges of the laminated glass window are arranged with a mutual spacing of 2 to 5 mm.

15. The electrically heated rear screen according to claim 7, wherein the end segments of the resistive heating wires which run parallel to the lateral edges of the laminated glass window are arranged with a mutual spacing of 2 to 5 mm.

16. The electrically heated rear screen according to claim 8, wherein the end segments of the resistive heating wires which run parallel to the lateral edges of the laminated glass window are arranged with a mutual spacing of 2 to 5 mm.

17. The electrically heated rear screen according to claim 1, wherein within a field of view of the laminated glass window, the resistive heating wires are arranged with a mutual spacing of 8 to 20 mm.

18. The electrically heated rear screen according to claim 5, wherein within a field of view of the laminated glass window, the resistive heating wires are arranged with a mutual spacing of 8 to 20 mm.

19. The electrically heated rear screen according to claim 9, wherein within a field of view of the laminated glass window, the resistive heating wires are arranged with a mutual spacing of 8 to 20 mm.

20. The electrically heated rear screen according to claim 15, wherein within a field of view of the laminated glass window, the resistive heating wires are arranged with a mutual spacing of 8 to 20 mm.

21. The electrically heated rear screen according to claim 1, wherein:

the resistive heating wires are made of copper or of a copper alloy covered with a reflection-limiting coating and have a diameter of 0.05 to 0.15 mm;

the end segments of the resistive heating wires which run parallel to the lateral edges of the laminated glass window are arranged with a mutual spacing of 2 to 5 mm; and the resistive heating wires, within a field of view of the laminated glass window, are arranged with a mutual spacing of 8 to 20 mm.

22. The electrically heated rear screen according to claim 1, wherein each of the meandering resistive heating wires connected up in parallel comprises three to seven loop segments extending across the width of the window.

23. The electrically heated rear screen according to claim 1, wherein the ends of the end segments of the resistive heating wires are brazed to fine collector conductors to which flat-cable connection elements are connected.

* * * * *

UNITED STATES PATENT AND TRADEMARK OFFICE
CERTIFICATE OF CORRECTION

PATENT NO. : 6,008,473

DATED : December 28, 1999

INVENTOR(S): Manfred GILLNER et al.

It is certified that an error appears in the above-identified patent and that said Letters Patent is hereby corrected as shown below:

On the title page, item [30], the Foreign Application Priority Data is incorrectly listed. It should be:

--[30] Foreign Application Priority Data

Feb. 28, 1998 [DE] Germany......................298 03 544--

Signed and Sealed this

Twenty-fourth Day of April, 2001

*Attest:*

NICHOLAS P. GODICI

*Attesting Officer*     *Acting Director of the United States Patent and Trademark Office*